United States Patent
Yueh

(10) Patent No.: US 7,831,787 B1
(45) Date of Patent: *Nov. 9, 2010

(54) HIGH EFFICIENCY PORTABLE ARCHIVE WITH VIRTUALIZATION

(75) Inventor: Jedidiah Yueh, Irvine, CA (US)

(73) Assignee: EMC Corporation, Hopkinton, MA (US)

( * ) Notice: Subject to any disclaimer, the term of this patent is extended or adjusted under 35 U.S.C. 154(b) by 201 days.

This patent is subject to a terminal disclaimer.

(21) Appl. No.: 11/968,040

(22) Filed: Dec. 31, 2007

Related U.S. Application Data

(63) Continuation-in-part of application No. 11/688,203, filed on Mar. 19, 2007, now Pat. No. 7,747,831.

(60) Provisional application No. 60/784,022, filed on Mar. 20, 2006.

(51) Int. Cl.
*G06F 13/00* (2006.01)

(52) U.S. Cl. .................... 711/161; 711/162; 711/6; 711/E12.016

(58) Field of Classification Search .............. 711/6, 711/161, 162, E12.016; 365/149
See application file for complete search history.

(56) References Cited

U.S. PATENT DOCUMENTS

| | | | |
|---|---|---|---|
| 5,642,505 A | 6/1997 | Fushimi | |
| 5,764,972 A | 6/1998 | Crouse et al. | |
| 6,275,953 B1 | 8/2001 | Vahalia et al. | |
| 6,732,293 B1 | 5/2004 | Schneider | |
| 6,795,966 B1* | 9/2004 | Lim et al. | 718/1 |
| 6,865,655 B1 | 3/2005 | Andersen | |
| 7,096,316 B1* | 8/2006 | Karr et al. | 711/114 |
| 7,149,858 B1* | 12/2006 | Kiselev | 711/162 |
| 7,277,905 B2 | 10/2007 | Randal et al. | |
| 7,343,459 B2 | 3/2008 | Prahlad et al. | |
| 7,346,263 B2 | 3/2008 | Honda | |
| 7,346,623 B2 | 3/2008 | Prahlad et al. | |
| 7,437,506 B1* | 10/2008 | Kumar et al. | 711/114 |

(Continued)

FOREIGN PATENT DOCUMENTS

CN 200780009902.X 6/2010

(Continued)

OTHER PUBLICATIONS

U.S. Appl. No. 11/688,203, filed Mar. 19, 2007, Jedidiah Yueh.

(Continued)

*Primary Examiner*—Mardochee Chery
(74) *Attorney, Agent, or Firm*—Workman Nydegger

(57) ABSTRACT

A high efficiency portable archive ("HEPA") implements a storage system running in a computer architecture to generate point-in-time versions of a raw data set. The HEPA can be implemented in a variety of computer architectures with the storage system being implemented as a conventional application on a host operating system or as a virtual system on a virtualization layer. In either case, the point-in-time versions and optionally the storage system itself can be archived on archive media. Alternately, the point-in-time versions and optionally the storage system itself can be replicated to a virtualized storage system first and then archived on archive media. The storage system and point-in-time versions of the raw data set can be restored into a virtual system on any hardware subsystem that supports the virtual system.

20 Claims, 6 Drawing Sheets

U.S. PATENT DOCUMENTS

| | | |
|---|---|---|
| 7,500,001 B2 | 3/2009 | Tameshige et al. |
| 2002/0069335 A1 | 6/2002 | Flylnn, Jr. |
| 2004/0225659 A1 | 11/2004 | O'Brien et al. |
| 2005/0125513 A1 | 6/2005 | Sin-Ling Lam et al. |
| 2005/0160243 A1 | 7/2005 | Lubbers et al. |
| 2005/0235288 A1 | 10/2005 | Yamakabe et al. |
| 2006/0059207 A1 | 3/2006 | Hirsch et al. |
| 2007/0174566 A1 | 7/2007 | Kaneda et al. |
| 2008/0013365 A1 | 1/2008 | Yueh |
| 2008/0215474 A1 | 9/2008 | Graham |
| 2008/0215796 A1 | 9/2008 | Lam et al. |
| 2008/0313371 A1 | 12/2008 | Kedem et al. |
| 2009/0222496 A1 | 9/2009 | Liu et al. |

FOREIGN PATENT DOCUMENTS

| | | |
|---|---|---|
| EP | 0774715 A1 | 5/1997 |
| EP | 07758941.4 | 6/2009 |
| WO | 99/09480 | 2/1999 |
| WO | 99/12098 | 3/1999 |
| WO | 02/37689 A1 | 5/2002 |
| WO | 2006/017584 A2 | 2/2006 |
| WO | PCT/US2007/0064440 | 2/2008 |
| WO | PCT/US2007/0068661 | 8/2008 |

OTHER PUBLICATIONS

U.S. Appl. No. 11/739,311, filed Apr. 24, 2007, Jedidiah Yueh.
U.S. Appl. No. 11/746,399, filed May 7, 2007, Jedidiah Yueh et al.
U.S. Appl. No. 11/747,567, filed May 11, 2007, Scott Ogata et al.
U.S. Appl. No. 11/772,183, filed Jun. 30, 2007, Jedidiah Yueh.
U.S. Appl. No. 11/688,203, Mail Date Sep. 10, 2009, Office Action.
U.S. Appl. No. 11/739,311, Mail Date Sep. 21, 2009, Office Action.
U.S. Appl. No. 11/746,399, Mail Date May 14, 2009, Office Action.
U.S. Appl. No. 11/747,567, Mail Date Sep. 30, 2009, Office Action.
U.S. Appl. No. 11/772,183, Mail Date Sep. 15, 2009, Office Action.
U.S. Appl. No. 12/762,769, filed Apr. 19, 2010, Jedidiah Yueh.
U.S. Appl. No. 11/688,203, Mail Date Mar. 3, 2010, Notice of Allowance.
U.S. Appl. No. 11/688,203, Mail Date Mar. 24, 2010, Notice of Allowance.
U.S. Appl. No. 11/739,311, Mail Date Mar. 1, 2010, Final Office Action.
U.S. Appl. No. 11/746,399, Mail Date Dec. 14, 2009, Final Office Action.
U.S. Appl. No. 11/747,567, Mail Date Feb. 24, 2010, Final Office Action.
U.S. Appl. No. 11/772,183, Mail Date Feb. 24, 2010, Final Office Action.
U.S. Appl. No. 12/762,769, Mail Date Jun. 23, 2010, Office Action.

\* cited by examiner

HIGH EFFICIENCY PORTABLE ARCHIVE WITH VIRTUALIZATION

CROSS-REFERENCE TO RELATED APPLICATIONS

This application is a continuation-in-part of U.S. patent application Ser. No. 11/688,203, filed Mar. 19, 2007 and entitled HIGH EFFICIENCY PORTABLE ARCHIVE, which claims the benefit of U.S. Provisional Application Ser. No. 60/784,022, filed Mar. 20, 2006 and entitled HIGH EFFICIENCY PORTABLE ARCHIVE. Both of the foregoing applications are incorporated herein by reference in their entirety.

BACKGROUND OF THE INVENTION

1. The Field of the Invention

The present invention relates to data storage and back-up solutions for archiving data and recovering data. More particularly, embodiments of the invention relate to software, hardware, systems, and methods for providing data protection in a manner that allows a user or customer to obtain a copy of information or stored data from a selected point of time and that provides for high efficiency data archiving and data portability.

2. The Relevant Technology

The need for reliable backup and archiving of information is well known. Businesses are devoting large amounts of time and money toward information system ("IS") resources that are devoted to providing backup and archive of information resident in computers and servers within their organizations that produce and rely upon digital information. The customers of the data storage industry are more frequently demanding that not only is their data properly backed up but also that when needed, such as after a system failure that causes a loss of data, that the backed up data be accessible at a particular point in time. In other words, there is an increasing demand for almost continuous data protection that allows data to be restored back to its state at a particular moment in time, which is most commonly a point in time just before their computer or data storage system crashed or was lost. The demand for point-in-time data protection, though, must also be balanced against the demand for low data storage costs, and typically, high speed optical and disk storage systems are more expensive to use as archive storage than tape-based data storage systems.

Driven by this demand for point-in-time archives and the growth of data storage, new technologies have emerged that store multiple versions or points in time of the primary data on disk storage using high efficiency techniques. These techniques allow multiple copies of the data, i.e., a data set "N" having a particular size from different points in time (e.g., data sets N1, N2, N3—where the numbers 1, 2, 3 represent different points in time at which changes may have been made to data set N), to be stored in a way that consumes far less capacity in a disk or optical data storage device or system than simply storing the data in its native state. For example, a high efficiency disk storage system might store the data sets N, N1, N2, and N3 in less than the total size of the original data set, N, or at least, using less storage capacity than the sum of the sizes of the data sets N+N1+N2+N3.

Today, there are multiple software or application-based approaches to storing copies of data in a highly efficient manner in order to provide point-in-time copies of data for backup, restore, and disaster recovery. These technologies include, but are not limited to, snapshots, file differencing techniques, content addressed storage systems, and systems that eliminate redundant data components that may be variable in size. While providing a more efficient method of archiving data, all of these systems use disk storage as their primary storage mechanism rather than less expensive tape media or tape storage systems.

Also, despite the existence of these high efficiency storage technologies, businesses still often need to store or move data onto alternate archive systems that may utilize removable tape media, optical storage, or other disk storage systems that may be less expensive or have different management attributes. In some cases, these archives are required to meet regulatory or other requirements. A problem with such archives is that they are often highly inefficient, e.g., with archiving involving expanding the data back into its original state for archive purposes (N+N1+N2+N3). Another problem with such archives is that the data is stored in such a fashion that it cannot be easily ported, restored, or managed in the future due to the proprietary nature of an implemented high efficiency storage methodology. For example, copying all of the volumes of a primary storage system using block-based snapshots to tape will yield a high efficiency dataset, but one that cannot be independently read or utilized without restoring the data to a system that matches the physical characteristics of the original hardware platform.

The subject matter claimed herein is not limited to embodiments that solve any disadvantages or that operate only in environments such as those described above. Rather, this background is only provided to illustrate one exemplary technology area where some embodiments described herein may be practiced.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
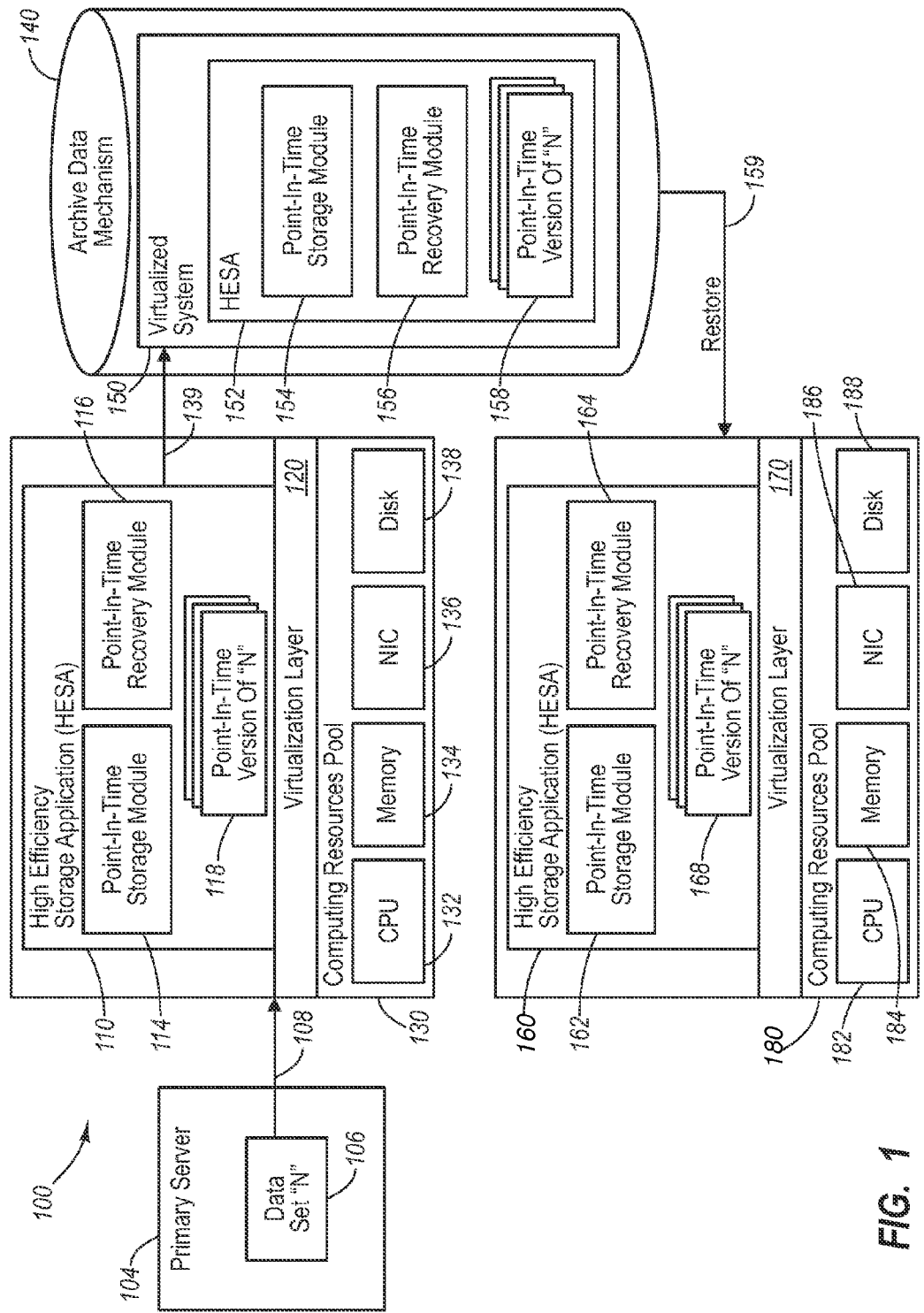
FIG. 1 illustrates in block diagram form a high efficiency portable archive ("HEPA") system according to one embodiment of the invention.

Reference will now be made to the drawings to describe various aspects of exemplary embodiments of the invention. It should be understood that the drawings are diagrammatic and schematic representations of such exemplary embodiments and, accordingly, are not limiting of the scope of the present invention, nor are the drawings necessarily drawn to scale.

Embodiments of the present invention are directed to methods and systems for providing high efficiency portable archives, i.e., archival data protection. One embodiment of a high efficiency portable archive ("HEPA") system may include or use a high efficiency storage system implemented as an application in a host system. Second, the HEPA system may use or include an external archive mechanism, such as a tape-based data storage system. According to another embodiment of the invention, a HEPA system may include or use a first high efficiency storage system implemented as an application or as a virtual system. Second, it may include a second high efficiency storage system implemented as a virtual system that acts as an archive proxy. Third, the HEPA system may use or include an external archive mechanism, such as a tape-based data storage system.

Alternately or additionally, embodiments of the invention may include the HEPA system tracking the files and/or clients backed up in a given point-in-time version of a primary data set, enabling seamless recovery from an external archive mechanism by an end user.

Advantageously, the high efficiency storage system can be archived as a system onto archive media such as tape storage. This archive can then be restored as a virtual machine or system to any hardware subsystem that supports the virtual system, and all of the versions of the data stored in the high efficiency storage system can be recovered or accessed from the high efficiency storage system itself.

Using the terminology provided above, one embodiment of a HEPA system includes a high efficiency storage system that can store multiple point-in-time versions of a dataset N, i.e., N, N1, N2, N3, etc., in less space than the sum of the sizes of the datasets, i.e., the sum of the sizes of N+N1+N2+N3. The high efficiency storage system may be run upon a virtualization layer, such as in a virtual machine ("VM"), that is provided in a standard computer architecture (such as a x86 architecture or the like). The virtualization layer virtualizes the hardware devices from the high efficiency storage system. Alternately, the high efficiency storage system may be run upon the operating system of the computer architecture.

In either case, the point-in-time versions and optionally the storage system itself can be archived as a checkpoint or virtual system (e.g., virtual appliance) onto archive media of the HEPA system, such as tape, optical, or disk storage. Alternately or additionally, the point-in-time versions and optionally the storage application itself can be replicated to a virtualized storage application prior to being archived onto archive media as a checkpoint or virtual system. In both cases, the archived storage application can then be ported as a virtual system onto any hardware subsystem that supports the virtual system. This allows the recovery of the stored datasets (N+N1+N2+N3) according to the recovery methodology of the original high efficiency storage system. A practical example of this invention would be to use a first instance software (running on a standard OS or on a VM) to replicate to a second instance software running on a VM and archiving a copy of the VMguest instance to a tape archive.

Advantageously, embodiments of the invention dramatically reduce the amount of data and the costs of archiving on many media, including disk, optical, and tape devices. In particular, by preserving data de-duplication in archives, archive media/storage costs can be reduced by as much as 90% or more.

To practice the invention, the computer and network devices may be any devices useful for providing the described functions, including well-known data processing and storage and communication devices and systems such as computer devices typically used as hosts in user systems with processing, memory, and input/output components, and server devices configured to maintain and then transmit digital data over a communications network. Data typically is communicated in digital format following standard communication and transfer protocols. The data storage resources are generally described as disk, optical, and tape devices that implement RAID and other storage techniques and that may use SCSI and other I/O, data transfer, and storage protocols, but the invention is not intended to be limited to the exemplary embodiments or to specific hardware and storage mechanisms as it is useful for nearly any data storage arrangement in which archives of digital data, such as data volumes, are generated and maintained.

FIG. 1 illustrates in simplified block form an example HEPA system 100 according to the invention. The system 100 includes one or more primary servers 104 that are storing a data set N 106 for which it is desired to provide archival back up or data protection. As shown, the HEPA system 100 includes a high efficiency storage application (or system) 110 that is generally any software-based or implemented technique for processing data, i.e., raw data sets, and to create data sets of reduced size for storage or back ups.

The storage application 110 includes a point-in-time storage function or module 114 that is used to generate compressed or otherwise more storage efficient versions for data sets, such as point-in-time versions of data sets that are significantly smaller in size than the original set being backed up or copied. Also, the storage application includes a data recovery methodology or module 116 that allows a set of point-in-time data sets to be restored or recovered after they have been stored in an efficient manner using the storage application 110 (e.g., using the module 114 or the like). For example, the storage application 110, in the point-in-time storage module 114 or other modules not shown, may employ one or more of the following technologies: snapshots, file differencing techniques, content addressed storage systems, continuous data protection ("CDP"), and systems that eliminate redundant data components that may be variable in size. In one embodiment, the storage application 110 implements commonality factoring technology, described in more detail in U.S. Pat. No. 6,810,398, which is herein incorporated by reference in its entirety.

Significantly, the HEPA system 100 includes a computing resources pool 130 that includes all computer resources for the system 100 such as processors/CPUs, memory, network devices (including NICs), servers, and memory/storage devices. The particular arrangement of the computer resources in pool 130 is not limiting to the invention with the storage application 110 using the resources for storing processed data (e.g., compressed or otherwise reduced-in-size data sets), recovered or restored data sets, and information/data used by the storage application 110 (such as by point-in-time data storage module 114 and recovery module 116) in efficiently storing and/or recovering the archived data. In this regard, the pool 130 includes a CPU 132, memory 134, NIC 136, and disk 138. The memory 134 and/or disk 138 may be used to store processing information for the storage application 110.

As shown at 108, the high efficiency storage application 110 functions to process the data set 106 to generate high efficiency point-in-time versions of N 118. The data set N 106 may be data of a host or client of the storage application 110, and the host/client may utilize the high efficiency storage application 110 to store or archive the raw data 106 to comply with its inside (or outside) regulatory agencies in an external data mechanism or system 140, which typically includes point-in-time versions of the data set N (as shown in FIG. 1). The processed data 118 may take numerous forms to practice the invention but preferably is stored in a manner that is reduced in size relative to the number of versions when the virtualized system including the point-in-time versions is later stored in archive 140 (e.g., the archived data is not simply the size of the data set N 106 multiplied by the number of versions but instead is some smaller size as the point-in-time versions 118 are typically smaller or more efficient versions), with the size and form of the versions 118 varying with the particular implementation of the storage application 110.

To provide an archived or protected version of the data set N at various points-in-time, as shown at 139, the high efficiency storage application 110 including the point-in-time versions of N 118 are stored in an archive data mechanism 140 as virtualized system 150. The virtualized system 150 includes a high efficiency storage application 152 with its storage module 154 and recovery module 156 as well as point-in-time versions of N 158. By storing the entire virtualized machine 150 in the archive mechanism 140 (which typically is an external device or system relative to the pool 130), a request to recover or restore the data set 106 at a particular point-in-time can be responded to as shown at 159 by providing a new virtual machine on a different virtualization layer 170, the virtual machine including a high efficiency storage application 160 generated based on the archived version 152.

The storage application 160 typically includes a point-in-time storage module 162 and a data recovery module 164. The recovery module 164 may be used to respond to a host/client request to recover or restore a raw set of data N 106 to a particular point in time (or to otherwise recover from a loss of data, a data corruption, or the like). To this end, the system 100 is adapted such that the storage application 160 can port to the archive data mechanism 140 to access the point-in-time versions of N 158 so as to recover the data 168 on a hardware subsystem of the pool 180, which may include a CPU 182, memory 184, NIC 186, and disk 188 or other devices. Such a recovery is performed using the data recovery tool or module 164 of the storage application 160 and can be performed on any hardware system, such as pool 180, that supports virtualization of application 110 even though the components of pool 180 may differ from pool 130.

More specifically, the storage applications 110, 180 use virtualization layers 120, 170 to shield the high efficiency storage application 110, 180 from the actual hardware devices in the pools 130, 160. The use of virtualization layers 120, 170 to run the storage applications 110, 180 (e.g., as a guest or virtual machine with its own operating system or with a host operating system) allows the virtual system 150 to be archived onto the archive data mechanism 140. Then, the high efficiency archive 150 can be ported onto a new hardware subsystem (which can be one or more hardware devices within pool 180 that is capable of supporting the virtual system 150), and the stored data sets can be recovered as shown at 168 (e.g., as N+N1+N2+ . . . +Nx) according to the recovery methodology 164 of the original high efficiency storage system 110. The hardware subsystem within pool 180 does not have to match the physical characteristics of the hardware platform/components used to create the archived data 158 (as was the case with prior archival systems).

The virtualization layers 120, 170 may take a number of forms to practice the invention. Generally, the virtualization layers 120, 170 are selected to act as an abstraction layer that decouples the physical hardware from the operating system associated with storage applications 110, 160 to deliver greater IS resource utilization and flexibility.

Virtualization by layers 120, 170 allows multiple virtual machines or guest machines (such as may be used to run applications 110, 180), with heterogeneous operating systems, to run in isolation but side-by-side on the same or a different physical machine Each virtual machine typically has its own set of virtual hardware (e.g., RAM, CPU, NIC, etc. within the pools 130, 160) upon which an operating system and applications including the storage applications 110, 180 are loaded. The operating system sees a consistent, normalized set of hardware regardless of the actual physical hardware components.

In general, virtual machines are encapsulated into files, making it possible to rapidly save, copy and provision a virtual machine. Full systems (fully configured applications, operating systems, BIOS and virtual hardware) can be moved, within seconds, from one physical server to another for zero-downtime maintenance and continuous workload consolidation. The portable or moved virtual machine with the storage application 110, 160 can be used to recover the point-in-time data set N 168 from the archive data mechanism 140 using recovery module 164. The virtualization layer 120, 170 may provide partitioning such that multiple applications, such as more than one version or instance of storage application 110, 180, and operating systems can be supported within a single physical system. Servers in the pools 130, 160 can be consolidated into virtual machines on either a scale-up or scale-out architecture, and computing resources are treated as a uniform pool 130, 160 to be allocated to virtual machines in a controlled manner, such as a guest machine (not shown) running the storage applications 110, 180 on virtualization layers 120, 170.

The virtualization layers 120, 170 also provide isolation. Virtual machines are completely isolated from the host machine and other virtual machines. If a virtual machine crashes, all others are unaffected. Data does not leak across virtual machines and applications can only communicate over configured network connections. The virtualization layers 120, 170 can also be configured or selected to provide encapsulation. In these embodiments, a complete virtual machine environment, e.g., a guest machine with storage application 110 or 180, is saved as a single file that is easy to back up, move, and copy in the system 100 as shown at 139 to archive data mechanism 140. The virtualization layers 120, 170 provide standardized virtualized hardware to the applications 110, 180, which guarantees compatibility or portability of the application 110 and the archives 168 that can be recovered via the storage application 180.

Figure 2:
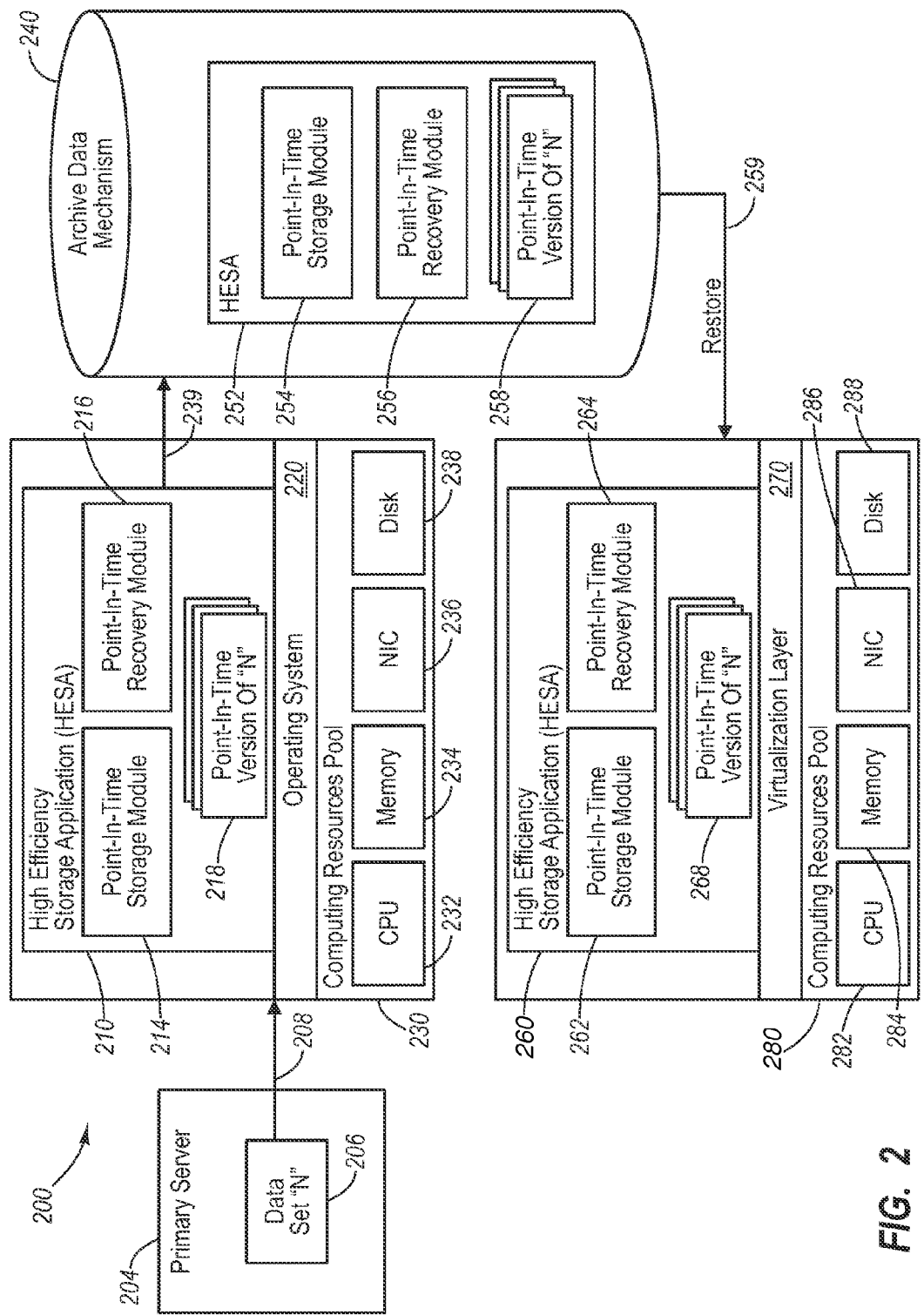
FIG. 2 illustrates in block diagram form another embodiment of a HEPA system.

FIG. 2 illustrates in simplified block form another example HEPA system 200 according to the invention. The system 200 is similar in many respects to the system 100 of FIG. 1. Briefly, the system 200 includes one or more primary servers 204 that are storing a data set N 206 for which it is desired to provide archival back up or data protection. The HEPA system 200 includes a high efficiency storage application (or system) 210 that includes a point-in-time storage module 214, a data recovery module 216, and point in time versions 218 of the data set N. Except where noted, the high efficiency storage system 210 and its components and data are configured and/or operate similar to the high efficiency storage system 110 and its components and data, as illustrated in FIG. 1 and explained above.

Additionally, the HEPA system 200 includes a computing resources pool 230, configured similar to the computing resources pool 130 of FIG. 1. In one embodiment of the invention, the computing resources pool 230 comprises a host system or server machine. The storage application 210 uses the resources in the pool 230 for storing processed data, recovered or restored data sets, and information/data used by the storage application 210 in efficiently storing and/or recovering the archived data. As shown at 208, the storage application 210 functions to process the data set 206 to generate the high efficiency point-in-time versions of N 218. In the embodiment of FIG. 2, the high efficiency storage application 210 is installed and run on the computing resources pool 230 as a conventional application, relying on a host operating system 220 for device support and physical resource management of the pool 230.

To provide an archived or protected version of the data set N at various points-in-time, as shown at 239, the high efficiency storage application 210 including the point-in-time versions of N 218 are stored in an archive data mechanism 240. A copy (e.g., a "checkpoint") 252 of the high efficiency storage application 210 is stored in the archive data mechanism 240, the checkpoint 252 including storage module 254, recovery module 256, and point-in-time versions of N 258. By storing the storage application checkpoint 252 in the archive mechanism 240 (which typically is an external device or system relative to the pool 230), a request to recover or restore the data set 206 at a particular point-in-time can be responded to as shown at 259 by providing a virtual machine (or system) on a virtualization layer 270 that includes a high efficiency storage application 260 generated based on the archived version 252.

Similar to the storage application 180 of FIG. 1, the storage application 260 typically includes a point-in-time storage module 262 and a data recovery module 264. The recovery module 264 may be used to respond to a host/client request to recover or restore a raw set of data N 206 to a particular point in time (or to otherwise recover from a loss of data, a data corruption, or the like). To this end, the system 200 is adapted such that the storage application 280 can port to the archive data mechanism 240 to access the point-in-time versions of N 258 so as to recover the data 268 on a hardware subsystem of the pool 280, which may include a CPU 282, memory 284, NIC 286, and disk 288 or other devices. Such a recovery is performed using the data recovery tool or module 264 of the storage application 260 and can be performed on any hardware system, such as pool 280, that supports virtualization of application 210 even though the components of pool 280 may differ from pool 230.

More specifically, the virtualization layer 270 shields the high efficiency storage application 260 from the actual hardware devices in the pool 280. The use of virtualization layer 270 to run the storage application 280 (e.g., as a guest or virtual machine with its own operating system or with a host operating system) allows the high efficiency storage application 252 to be archived onto the archive data mechanism 240. Then, the high efficiency archive 252 can be ported onto a new hardware subsystem (which can be one or more hardware devices within pool 260 that are capable of supporting the storage application 252), and the stored data sets can be recovered as shown at 268 (e.g., as N+N1+N2+ . . . +Nx) according to the recovery methodology 264 of the original high efficiency storage system 210. The hardware subsystem within pool 260 does not have to match the physical characteristics of the hardware platform/components of pool 230 used to create the archived data 258 (as was the case with prior archival systems).

Figure 3:
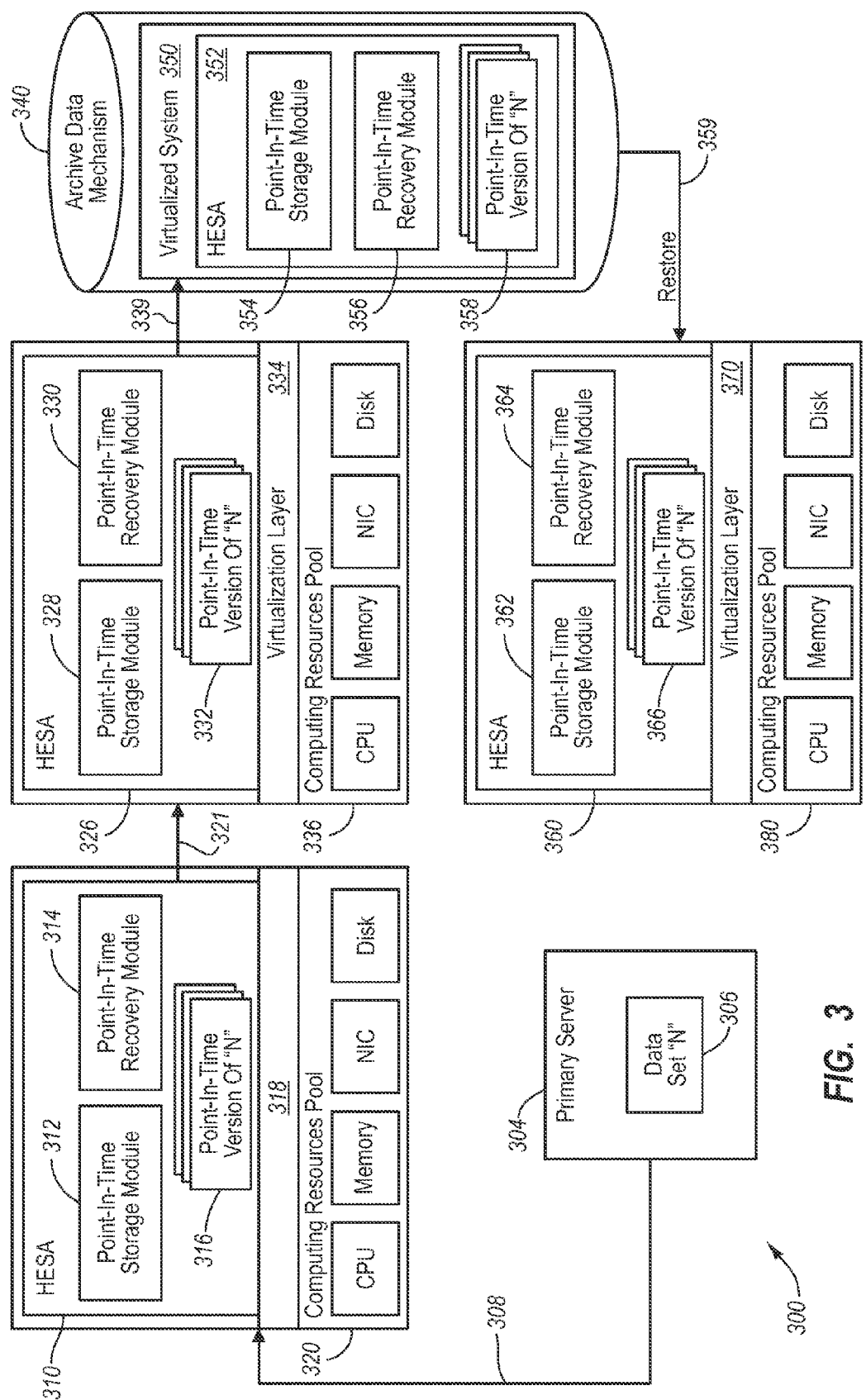
FIG. 3 illustrates in block diagram form an embodiment of a HEPA system that includes a proxy.

FIG. 3 illustrates in simplified block form another example HEPA system 300 according to the invention. The system 300 includes one or more primary servers 304 that are storing a data set N 306 for which it is desired to provide archival back up or data protection. Embodiments of the invention described herein thus relate to backup and/or archive data.

The HEPA system 300 includes at least two high efficiency storage applications (or systems) 310 and 326 that are generally any software-based or implemented technique for processing data, i.e., raw data sets, and to create and/or store data sets of reduced size for storage or back ups or archive. The storage applications 310, 326 include, respectively, point-in-time storage modules 312, 328, data recovery modules 314, 330, and point-in-time versions 316, 332 of the data set N 306. Typically, the storage applications 310, 326, corresponding storage modules 312, 328, and corresponding recovery modules 314, 330, are identical to each other. Except where noted, the storage applications 310, 326 and their components and data are configured and/or operate just as the high efficiency storage system 110 and its components and data, as illustrated in FIG. 1 and explained above.

A first computing resources pool 320 provides the resources used by storage application 310 to store processed data, recovered or restored data sets, and information/data used by the storage application 310 in efficiently storing and/or recovering the archived data. The computing resources pool 320 may be configured similar to the computing resources pool 130 of FIG. 1 and may comprise, for example, a first host system or server machine. As shown at 308, the storage application 310 functions to process the data set 306 to generate the high efficiency point-in-time versions of N 316.

The high efficiency storage application 310 is installed and run on the software platform 318. In one embodiment, the platform 318 comprises a host operating system, and the storage application 310 is installed and run as a conventional application, relying on the operating system 318 for device support and physical resource management. In another embodiment of the invention, the platform 318 comprises a virtualization layer, and the storage application 310 is installed and run on the virtualization layer 318 to shield the storage application 310 from the underlying resources in the computing pool 320.

Figure 4:
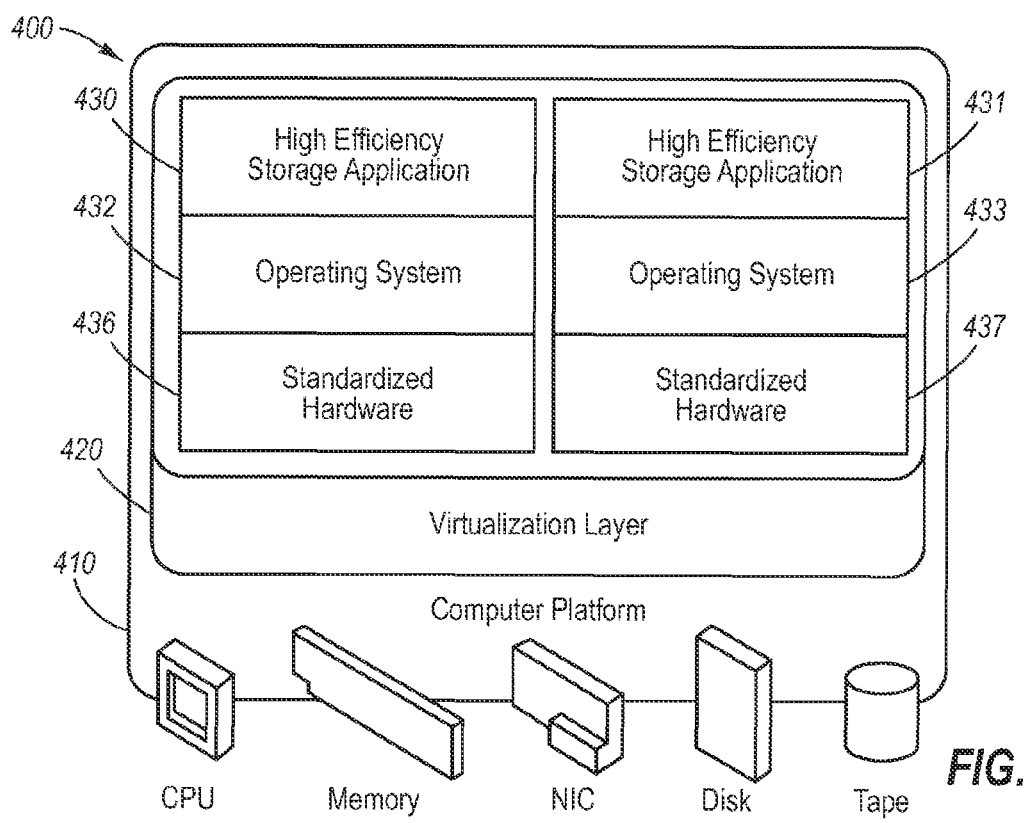
FIG. 4 illustrates a HEPA system according to another embodiment of the invention using a virtualization layer to separate a storage application and associated operating system from a computer architecture.
Figure 5:
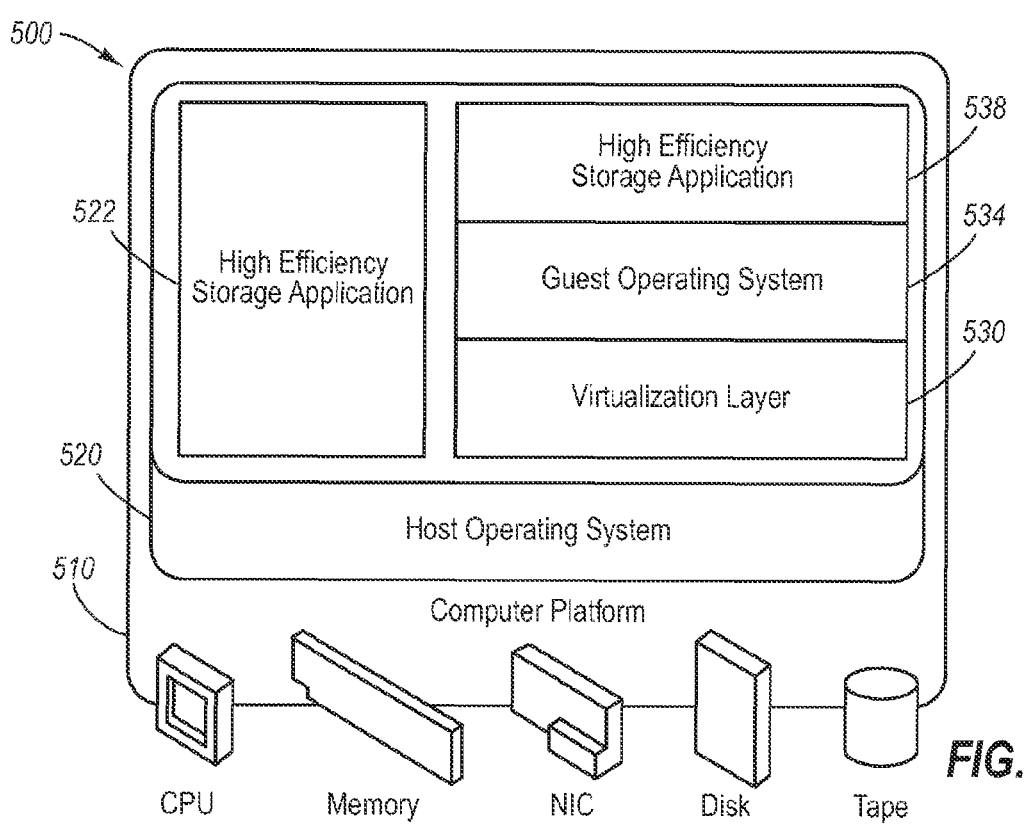
FIG. 5 is another HEPA system of the invention that is similar to that of FIG. 2 but arranged as a hosted architecture.

As shown at step 321, the storage application 310 replicates data, such as the point-in-time versions of N 316, to the second storage application 326. The second storage application 326 uses the resources in a second computing resources pool 336 to store processed data, recovered or restored data sets, and information/data used by the second storage application 326 in efficiently storing and/or recovering the archived data. The second computing resources pool 336 may be configured similar to the computing resources pool 130 of FIG. 1 and may comprise, for instance, a second host system or server machine. Although the first pool 320 and second pool 336 are illustrated as separate pools, in some embodiments they may be the same pool, in which case the first and second storage applications 310, 326 may be configured as illustrated in FIG. 4 or 5 to share resources from a common pool.

Returning to FIG. 3, the second storage application 326 is installed and run on virtualization layer 334, which shields the storage application 326 from the underlying resources in the computing resources pool 336. Consequently, the components of pool 336 may be identical to or different than the components of pool 320.

To provide an archived or protected version of the data set N at various points-in-time, as shown at 339, the high efficiency storage application 326—including the replicated point-in-time versions of N 332—is stored in an archive data mechanism 340 as virtualized system 350. The virtualized system 350 includes a high efficiency storage application 352 with its storage module 354 and recovery module 356 as well as the point-in-time versions of N 358. By storing the entire virtualized machine 350 in the archive mechanism 340 (which typically is an external device or system relative to the pools 320, 336), a request to recover or restore the data set 306 at a particular point in time can be responded to as shown at 359 by providing a virtual machine on a virtualization layer 370 that includes a high efficiency storage application 360 generated from or based on the archived version 352.

Alternately or additionally, a checkpoint of the storage application 326, rather than a virtualized system 350, is stored in the archive mechanism 340, the checkpoint including a storage module, recovery module, and point-in-time versions of N. In this case, a request to restore the checkpoint can be responded to by restoring the checkpoint into a virtual machine, such as either of the virtual machines comprising storage applications 326 or 360.

Similar to the storage application 160 of FIG. 1, the storage application 360 typically includes a point-in-time storage module 362 and a data recovery module 364. The recovery module 364 may be used to respond to a host/client request to recover or restore a raw set of data N 306 to a particular point in time (or to otherwise recover from a loss of data, a data corruption, or the like). To this end, the system 300 is adapted such that the storage application 360 can port to the archive data mechanism 340 to access the point-in-time versions of N 358 so as to recover the data 366 on a hardware subsystem of the pool 380, which may include a CPU 382, memory 384, NIC 386, and disk 388 or other devices. Such a recovery is performed using the data recovery tool or module 364 of the storage application 360 and can be performed on any hardware system, such as pool 380, that supports virtualization of application 326 even though the components of pool 380 may differ from pool 336.

More specifically, the storage applications 326, 360 use virtualization layers 334, 370 to shield the high efficiency storage application 326, 360 from the actual hardware devices in the pools 336, 380. The use of virtualization layers 336, 370 to run the storage applications 326, 360 (e.g., as a guest or virtual machine with its own operating system or with a host operating system) allows the virtual system 350 to be archived onto the archive data mechanism 340. Then, the high efficiency archive 350 can be ported onto a new hardware subsystem (which can be one or more hardware devices within pool 380 that are capable of supporting the virtual system 350), and the stored data sets can be recovered as shown at 366 (e.g., as N+N1+N2+ . . . +Nx) according to the recovery methodology 364 of the original high efficiency storage system 310. The hardware subsystem within pool 380 does not have to match the physical characteristics of the hardware platform/components of either of pools 320 or 336.

Although the high efficiency storage application 360 is shown as separate from high efficiency storage application 326, in one embodiment of the invention, the storage applications 360 and 326 (and their corresponding modules) are the same storage application (and corresponding modules). According to this embodiment, the storage application 326 is a replication target at step 321 as well as a restoration/recovery target at step 359, rather than having separate replication and restoration targets as illustrated in FIG. 3.

Advantageously, in the embodiment of FIG. 3, the storage application 326 becomes a proxy for archiving the storage application 310 and/or the point in term versions of N 316. This enables the storage application 310 to offload archive processing to the virtualized storage application 326. This is because the step 321 of replicating to the virtualized storage application 326 can typically be performed much more quickly than actually archiving to the archive data mechanism 340. As another benefit, the virtualized storage application 326 can service data received from a plurality of high efficiency storage applications, becoming a proxy that can be shared across multiple systems.

In some embodiments of the invention, the high efficiency storage application (e.g., applications 110, 210, or 326 of FIGS. 1, 2 and 3) tracks the clients and files serviced by the storage application. For instance, the storage application may keep track of which files from a primary server are backed up by the storage application and which archives the files are archived to. This information is made available to the recovery module of the storage application.

Advantageously, this enables a seamless recovery process. For example, when recovery is desired, a user can access the recovery module. The user selects a date range and a client (e.g., the primary server) and the recovery module presents a file system view of available backups (e.g., point-in-time versions) for the client. Once the user has identified and selected a desired backup file from a particular date, the recovery module can automatically restore the backup file from wherever it is stored. In particular, because the storage application has tracked which files for which clients have been archived to which archives, the recovery module can initiate a command line restore from the appropriate archive to restore the desired backup file. Alternately or additionally, the recovery module may restore the desired backup file to one location, open up a management interface, and then allow the user to completely restore the desired backup file.

Turning to FIG. 4, one embodiment of an HEPA system 400 according to the invention is depicted. As shown, a computer architecture or platform 410 (such as the x86 architecture, or the like) includes a number of resources such as CPUs, memory, network devices, disk, and tape mechanisms. A virtualization layer 420 is provided to manage access to or "virtualize" the architecture 410 into a uniform pool and separate the hardware of this pool from one or more virtual machines (i.e., the system 400 is shown with 2 such virtual or guest machines running on the virtualization layer 420—but more such machines may be run). The virtualization layer 420 presents a virtualized representation 436, 437 to an operating system 432, 433 of each virtual or guest machine. The operating systems 432, 433 may also vary and may include for example, Windows, Linux, Novell, Solaris, and other operating systems such as FreeBSD and the like. High efficiency storage applications 430, 431 are provided and associated with the instances of operating systems 432, 433 and use the virtual systems 436, 437 to process raw data to create more space efficient versions (e.g., compressed versions compared to the size of the raw data set) that are stored to an archive mechanism in the architecture 410 (such as a tape device or a disk or optical device).

The HEPA system 400 illustrates aspects of one embodiment of the HEPA system 300 of FIG. 3. In particular, the HEPA system 400 may correspond to portions of the HEPA system 300, provided the storage application 310 is installed and run on a virtualization layer 318 and the computing resources pool 320, 336 are the same pool. According to this embodiment, the storage applications 430, 431 correspond to the storage applications 310, 326, while the virtualization layer 420 corresponds to the virtualization layers 318, 334 and the computer platform 410 corresponds to the computing resources pools 320, 336.

FIG. 5 illustrates an alternative arrangement for a HEPA system 500 according to the invention. As with system 400, the system 500 includes a set of computer hardware or a particular architecture 510 that is pooled by a virtualization layer 530 and is shielded from one high efficiency storage application 538. However, in this case, the virtual machine includes the virtualization layer 530 and the virtual machine is installed and run as an application, e.g., similar to a second high efficiency storage application 522. The virtualization layer 530 relies on a host OS 520 for device support and physical resource management of the architecture 510 and presents a guest operating system 534 to the storage application 538.

The HEPA system 500 illustrates aspects of another embodiment of the HEPA system 300 of FIG. 3. In particular, the HEPA system 500 may correspond to portions of the HEPA system 300 where the storage application 310 is installed and run on a host operating system 318 and the computing resources pool 320, 336 are the same pool. According to this embodiment, the storage applications 522, 538 correspond respectively to the storage applications 310, 326, while the operating system 520 corresponds to the operating system 318, the virtualization layer 530 corresponds to the virtualization layer 334, and the computer platform 510 corresponds to the computing resources pools 320, 336.

Figure 6:
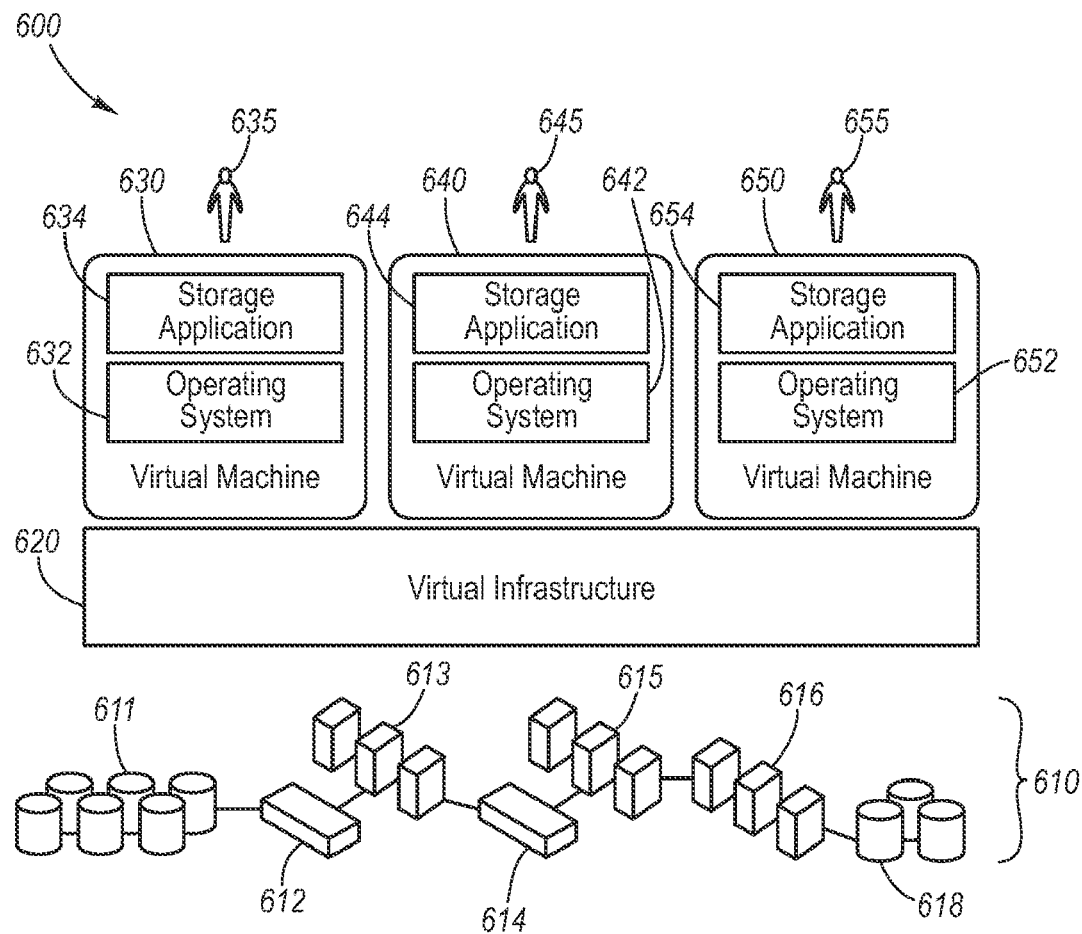
FIG. 6 is yet another HEPA system of the invention illustrating the use of the virtual infrastructure or layer to allow multiple virtual machines to access a computer resources pool including devices used for providing archives of data sets.

FIG. 6 illustrates yet another HEPA system 600 according to the present invention. The HEPA system 600 includes a computer resources pool or computer architecture/platform 610 that includes the hardware and associated software available in the system 600. The pool 610 includes storage 611, 618 that may include nearly any type of storage device for digital data such as tape-based storage devices and systems and disk and optical devices. The pool 610 also includes networks/network devices 612, 614 and a number of servers or other computing devices 613, 615, 616 (which may also be used as data storage in some cases with storage 611, 618 being used for archive or back up storage).

Upon the platform 610, a virtualization infrastructure 620 is provided for connecting the resources in pool 610 to users (or to a business/enterprise) 635, 645, 655. The virtual infrastructure 620 provides a dynamic mapping of the resources in pool 610 to one or more virtual machines 630, 640, 650. Each of the virtual machines 630, 640, 650 runs an operating system 632, 642, 652 and a high efficiency storage application 634, 644, 654. The storage applications 634, 644, 654 may be the same applications or different applications, and each storage application 634, 644, 654 may be ported to data that has been archived according to its high efficiency storing methods and may use its recovery functionality to recover or restore such data on a hardware subsystem within pool 610 provided by virtual infrastructure 620 as being capable of supporting the virtual machine 630, 640, 650 and its associated virtual storage system. For example, point-in-time versions of a data set stored in storage 611 or 618 may be accessed by a virtual machine 630, 640, 650 via one or more of the servers 613, 615, 616 (and/or other resources in pool 610) to recover a desired set of data (e.g., N+N1+Nx or the like), such as based on a recovery request from a user 635, 645, 655.

Figure 7A:
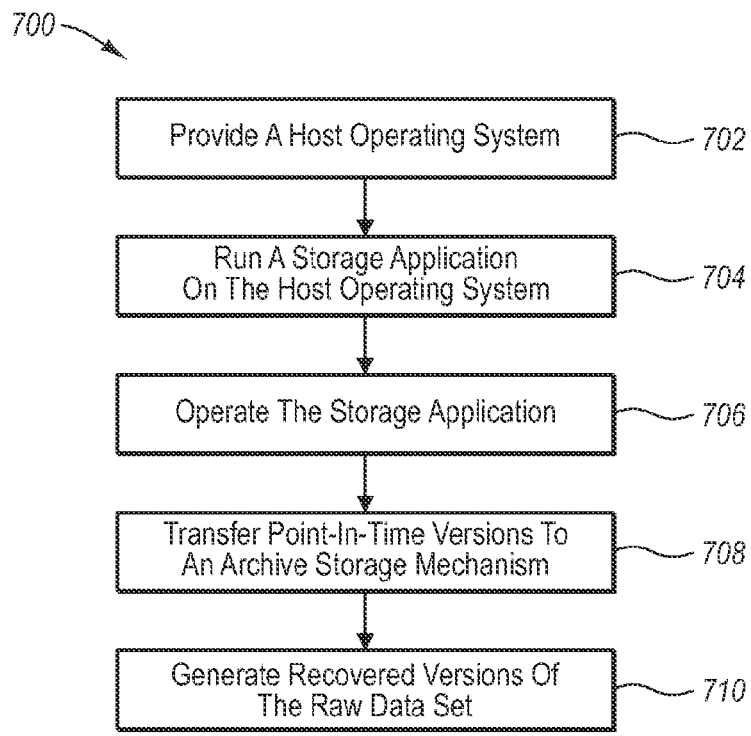
FIGS. 7A and 7B depict two example methods for providing data protection according to embodiments of the invention.

With reference now to FIG. 7A, a first method 700 is illustrated for providing data protection. A typical computer architecture in which the method 700 may be implemented includes a storage device on which a raw data set is stored, an archive storage mechanism and one or more hardware components. The process 700 begins by providing 702 a host operating system on the computer architecture and running 704 a high efficiency storage application on the operating system. One of skill in the art can appreciate that the operating system may already be present and embodiments of the invention may begin by running 704 or executing 706 a high efficiency storage application on the operating system. The operating system provides device support and physical resource management of the computer architecture. In other words, the high efficiency storage application is installed and/or run in the computer architecture as a conventional application that is not virtualized.

One purpose of the storage application is to generate and store point-in-time versions of the raw data set in the event the raw data set is lost, corrupted, or otherwise damaged. Thus, the storage application is operated 706, as already described above, to generate and store versions of the raw data set.

The point-in-time versions of the raw data set may be transferred (e.g., moved or copied) 708 to the archive storage mechanism by the storage application. They may be transferred to the archive storage mechanism along with the storage application itself as a complete virtual machine environment. Later, the entire virtual machine environment may be transferred or copied into a hardware subsystem where a point-in-time recovery module of the storage application can be used to generate 710 a recovered version of the raw data set in the hardware subsystem. The recovery process may begin in response to a recovery request received by the recovery module from a user.

Figure 7B:
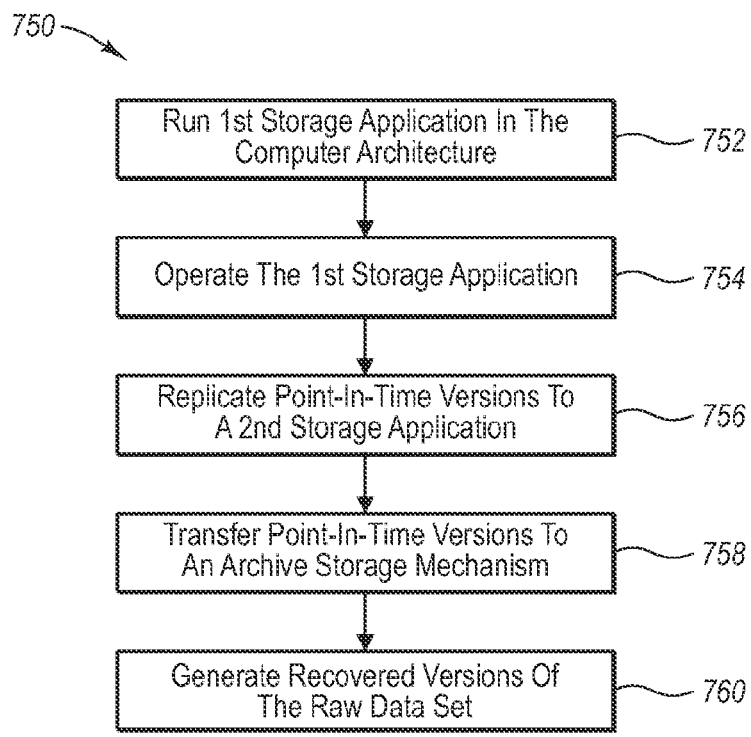

With reference now to FIG. 7B, a method 750 is illustrated for providing data protection using a proxy. A typical computer architecture in which the method 750 may be implemented includes a storage device on which a raw data set is stored, an archive storage mechanism and one or more hardware components. The process 750 typically begins by running 752 a first high efficiency storage application in the computer architecture. The first storage application can be run as a conventional application on a host operating system or as a virtual machine on a virtualization layer. In either case, the first storage application is operated 754, as already described above, to generate and store versions of the raw data set.

The point-in-time versions of the raw data set are replicated 756 to a second high efficiency storage application. As described above, the second high efficiency storage application is run on a virtualization layer and can be more accurately described as a virtualized high efficiency storage application. Optionally, at step 756 the entire first storage application, including storage module, recovery module, and point-in-time versions of the raw data set, can be replicated onto the virtualization layer to create the virtualized storage application.

The point-in-time versions of the raw data set replicated to the virtualized storage application may be transferred (e.g., moved or copied) 758 to the archive storage mechanism by the virtualized storage application. In one embodiment, they may be transferred to the archive storage mechanism along with the virtualized storage application itself as a complete virtual machine environment. Later, the entire virtual machine environment may be transferred or copied into a hardware subsystem where a point-in-time recovery module for the virtualized storage application can be used to generate

760 a recovered version of the raw data set in the hardware subsystem. The hardware subsystem may be the same as or different from a hardware subsystem used by the second high efficiency storage application. The recovery process may begin in response to a recovery request received by the recovery module from a user.

As discussed above, the virtualization layer or infrastructure (such as those shown in FIGS. 1-6) may take a number of forms to practice the invention. As discussed above, high efficiency storage applications of the HEPA systems of FIGS. 1-4 may vary to practice the invention. Embodiments of the high efficiency storage and data recovery methodologies implemented in this software suite are described in U.S. Pat. No. 6,810,398, incorporated herein by reference. One of skill in the art can appreciate that other HESA applications can be used in embodiments of the invention. Additionally, the following description is an overview of a system that may be used as part of a high efficiency storage application of the invention.

Embodiments of the invention address the need for enterprise data protection and are designed to more effectively address data backup and recovery. In one example, the challenge of data compression and redundancy of backup data at the source, is addressed using commonality factoring technology, which reduces or even eliminates redundant data. Agents identify and filter repeated data sequences stored in files within a single system, across systems, and over time at each client so that each unique data sequence is only backed up once within the enterprise, greatly reducing the overall data that must be transmitted over the network and stored within the system. As a result of this approach, copied or edited files, shared applications, embedded attachments, and even a daily changing database only generate a small amount of incremental storage for an example system.

The commonality factoring technique allows a changed file to efficiently be analyzed and split into variable sized blocks averaging 12 KB in size, which are then assigned a 20-byte content address based on the contents of the information. An assessment is then made to determine whether that information has already been stored within the system (e.g., has already been backed up on this system or another system at some point in the past) and if so, does not backup the data again but stores only the content address pointing to the existing information. By performing this analysis at the client, embodiments of the invention, including the HESA, can effectively deliver a 600-1 reduction (20 bytes sent to represent a 12 KB block of data) for data that is already stored, and on average provides greater than 100-1 reduction in backup data when performing daily full backups.

As this description of the HESA product and technology implies, it is useful in understanding how one embodiment of HESA acts to find changed files and then break these files into blocks or atomics, e.g., how breakpoints are selected in data sequences to better determine what has been changed and requires backup. This technique may be described as follows: One of the key factors for performing reduction of redundant data at a sub-file level is a method to effectively determine common sequences of data when analyzing large volumes of data. Most techniques for assessing sub-file level changes utilize a simplistic method for analyzing files using fixed block boundaries, which are typically 512 bytes in size. These techniques, however, perform poorly under many circumstances. If a slight change is introduced at the beginning of a file or document, the contents of the entire file get shifted resulting in a fixed block size analysis detecting the entire file as being modified.

Embodiments of the invention analyze sequences of data and divide the data such that common elements may be found on multiple related and unrelated computer systems without the need for communication between the computers and without regard to the data content of the files. This method determines logical or "sticky byte" breakpoints within data sequences to efficiently and effectively divide a data set into pieces that yields optimal commonality. If a document or file is edited such that new information is placed at the beginning of the file and existing data is deleted from the middle of the file, the 'sticky byte' factoring of the file ensures that only a small percentage of the total file is actually detected as having been modified. This technique is also extremely effective when performing delta analysis of large database dump files, resulting in only a small percentage of the total data being detected as modified (and subsequently backed up over the network) despite changes in tables throughout the database.

The embodiments described herein may include the use of a special purpose or general-purpose computer including various computer hardware or software modules, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired and wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for providing data protection, comprising:
running a first storage application on a host operating system on a computer architecture that includes a storage device storing a raw data set, an archive storage mechanism and a first hardware subsystem;
storing, by the first storage application a plurality of versions of the raw data set in the archive storage mechanism;
running a second storage application on a virtualization layer on a second hardware subsystem of the computer architecture, wherein the virtualization layer operates on the second hardware subsystem and presents a representation of a the first hardware subsystem of the computer architecture to the second storage application; and
generating, by a recovery module of the second storage application, a recovered version of the raw data set based on the plurality of versions of the raw data set stored in the archive storage mechanism, wherein the virtualization layer shields the second storage application from the second hardware subsystem and allows the second hardware subsystem to be different from the hardware subsystem associated with the first storage application, wherein the recovered version is recovered on the representation of the first hardware subsystem presented by the virtualization layer operating in the second hardware subsystem.

2. The method of claim 1, wherein the second storage application comprises a copy of the first storage application.

3. The method of claim 1, wherein the raw data set has a size and wherein a size of the plurality of versions of the raw data set is less than the size of the raw data set multiplied by the number of versions stored in the archive storage mechanism.

4. The method of claim 1, wherein the hardware subsystem differs at least partially from hardware components of the computer architecture used in the operating of the first storage application to store the plurality of versions of the raw data set in the archive storage mechanism.

5. The method of claim 1, wherein the first storage application tracks where the plurality of versions of the raw data set are archived to such that when a particular file within the plurality of versions of the raw data is requested for restoration, it can be quickly located.

6. The method of claim 1, further comprising, prior to using the recovery module of the second storage application to generate a recovered version of the raw data set, receiving a recovery request from a user.

7. The method of claim 1, wherein at least one of the first or second storage application includes commonality factoring.

8. A method for providing data protection and archiving using a proxy, comprising:
running a first storage application in a first computer architecture that includes a storage device storing a raw data set, an archive storage mechanism, a first hardware subsystem, and a second hardware subsystem;
generating and storing, by the first storage application, a plurality of versions of the raw data set;
replicating the plurality of versions of the raw data set to a second storage application, the second storage application being run on a second virtualization layer, wherein the second virtualization layer presents a representation of the first hardware subsystem to the second storage application;
storing, by the second storage application, the plurality of versions of the raw data set to the archive storage mechanism;
running a third storage application on a third virtualization layer, wherein the third virtualization layer presents a representation of the second hardware subsystem to the third storage application; and
generating, by a recovery module of the third storage application, a recovered version on the second hardware subsystem of the raw data set based on the plurality of versions of the raw data set stored in the archive storage mechanism, wherein the second virtualization layer shields the second storage application from the first hardware subsystem and the third virtualization layer shields the third storage application from the second hardware subsystem to allow the recovery module to generate the recovered version on the second hardware subsystem, wherein the recovered version is recovered on the representation of the first hardware subsystem presented in the second hardware subsystem.

9. The method of claim 8, wherein running the first storage application in a computer architecture comprises running the first storage application on a first virtualization layer, the first virtualization layer presenting a representation of a set of hardware based on components of the computer architecture to the first storage application.

10. The method of claim 8, wherein running the first storage application in a computer architecture comprises running the first storage application on a host operating system provided in the computer architecture, the host operating system providing device support and physical resource management of components of the computer architecture for the first storage application.

11. The method of claim 8, wherein the third storage application is the second storage application, the third virtualization layer is the second virtualization layer, and the second hardware subsystem is the first hardware subsystem, such that the second storage application is used as a replication target and a recovery target.

12. The method of claim 8, wherein the third storage application is a copy of the second storage application.

13. The method of claim 8, further comprising, replicating a plurality of versions of a plurality of raw data sets from a plurality of first storage applications to the second storage application, the second storage application being configured as an archive proxy.

14. The method of claim 8, wherein the raw data set has a size and wherein a size of the plurality of versions of the raw data set is less than the size of the raw data set multiplied by the number of versions stored in the archive storage mechanism.

15. The method of claim 8, wherein the first hardware subsystem, second hardware system, or both hardware systems, differ at least partially from hardware components of the computer architecture used in the operating of the first storage application.

16. In an environment including at least one server storing a raw data set, a method for storing and archiving point-in-time versions of the raw data set, the method comprising:
operating a first storage application on an operating system on a computing resources pool, the host operating system providing device support and physical resource management of components of the computing resources pool for the first storage application;

generating storage efficient versions of a raw data set that is stored on one or more servers, wherein the storage efficient versions include point-in-time versions of the raw data set that are smaller in size than the raw data set;

storing the storage efficient versions of a raw data set on an archive data mechanism; and recovering the raw data set at a particular point-in-time using a virtualized storage application on a virtualization layer, wherein the virtualization layer decouples the virtualized storage application from the computing resources pool and wherein the virtualized storage application recovers the raw data set at the particular point-in-time independently of the computing resources pool.

17. The method of claim 16, further comprising archiving the first storage application onto the archive data mechanism.

18. The method of claim 17, further comprising porting the first storage application onto a new hardware subsystem, wherein the new hardware subsystem does not match a hardware system of the computing resources pool.

19. The method of claim 18, further comprising providing the virtualization layer on the new hardware subsystem, wherein the first storage application becomes the virtualized storage application upon being ported onto the new hardware subsystem, and wherein the virtualization layer presents a representation of a set of hardware based on components of the new hardware system to the virtualized storage application.

20. The method of claim 16, wherein the second storage application tracks where the plurality of versions of the raw data set are archived to such that when a particular file within the plurality of versions of the raw data is requested for restoration, it can be quickly located.

\* \* \* \* \*